Figure 1:
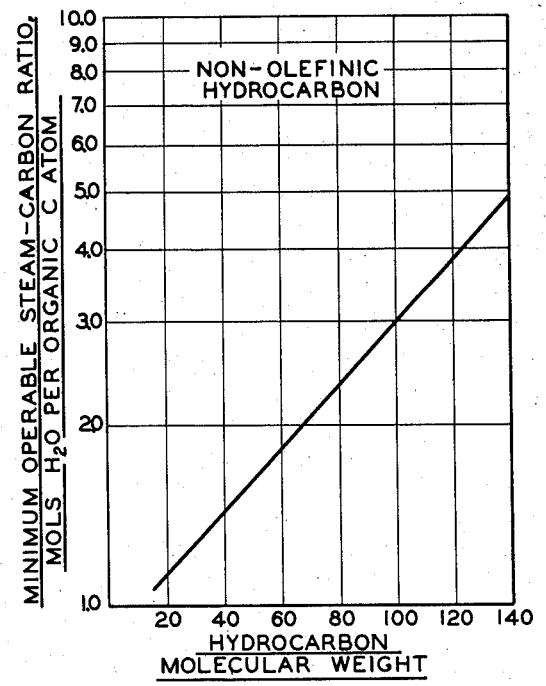

INVENTORS
THOMAS E. LOCKERBIE
JOSEPH M. FOX 3RD.
BY
*D. H. Palmer*
*John C. Quinlan*
ATTORNEYS

United States Patent Office 3,106,457
Patented Oct. 8, 1963

3,106,457
PRODUCTION OF HYDROGEN BY CATALYTIC STEAM REFORMING OF HYDROCARBONS
Thomas E. Lockerbie, Berkley, Mich., and Joseph M. Fox 3rd, Glen Ridge, N.J., assignors to The M. W. Kellogg Company, Jersey City, N.J., a corporation of Delaware
Filed Mar. 22, 1960, Ser. No. 16,714
10 Claims. (Cl. 23—212)

This invention relates to a process for the production of hydrogen by catalytic steam reforming of hydrocarbons.

Catalytic steam reforming of natural gas is a proven commercial technique for producing hydrogen useful in the preparation of ammonia synthesis gas, methanol, Fischer-Tropsch synthesis gas, and low-B.t.u. carrier gas. In recent years, the chemical industry has begun to show interest in refinery gases, coke oven gases, and light liquid hydrocarbons as potential catalytic steam reforming feedstocks. Unfortunately, however, the conditions used in the successful catalytic steam reforming of a feedstock containing methane as its predominant hydrocarbon constituent, such as natural gas, are wholly unsuitable to successful reforming of feedstocks containing significant amounts of hydrocarbons heavier than methane, such as the feedstocks discussed above. When conditions suitable to natural gas reforming are used with heavier or olefinic feedstocks, carbon is produced resulting in a gradual decline in the activity of the reforming catalyst and plugging of the catalyst bed and equipment. Such catalyst deactivation and plugging necessitates periodic interruption of the process in order to clean and recondition the catalyst, making the process commercially unattractive.

It is, therefore, an object of this invention to provide a process for the production of hydrogen by catalytic steam reforming of hydrocarbons heavier than methane. It is another object of the invention to provide a process for the production of hydrogen by catalytic steam reforming of hydrocarbons containing olefins. A further object of this invention is to provide a process for the production of hydrogen by catalytic steam reforming of hydrocarbons whereby carbon formation is substantially avoided.

Various other objects and advantages of the invention will appear from the following detailed discussion and description.

Catalytic steam reforming of feedstocks containing appreciable amounts of hydrocarbons heavier than methane, including olefins, can be conducted successfully without substantial carbon formation by admixing with the feedstock a critical minimum amount of steam prior to contacting the admixture with the reforming catalyst.

It has been found that for any individual hydrocarbon, including olefinic hydrocarbons, there is a minimum molar ratio of steam to organic carbon required for the carbon-free (operable) catalytic reforming of that individual hydrocarbon. It has also been found that among olefinic and non-olefinic hydrocarbons as distinct groups, the minimum operable steam-carbon ratios for individual members of the group vary in accordance with the molecular weight. Finally it has been found that for any mixture of hydrocarbons the critical minimum amount of steam which must be used with the mixture for its carbon-free catalytic reforming is that amount corresponding to a weighted average of the minimum operable steam-carbon ratios of the individual constituents of the mixture of hydrocarbons.

FIGURE 1 of the drawing presents experimental data in semi-logarithmic form correlating the minimum operable steam-carbon ratio in mols of water per organic carbon atom with molecular weight for non-olefinic hydrocarbons, including paraffins, naphthenes, and aromatics. The linear relationship between the variables in FIGURE 1 is expressed mathematically as:

$$(R_1)_{n-0} = (0.89)(10)^{0.0052\,M} \ldots \quad (1)$$

where
$(R_1)_{n-0}$ = the minimum operable steam-carbon ratio for a non-olefinic hydrocarbon, mols steam per organic carbon atom; and
$M$ = the molecular weight of the non-olefinic hydrocarbon.

Figure 2:
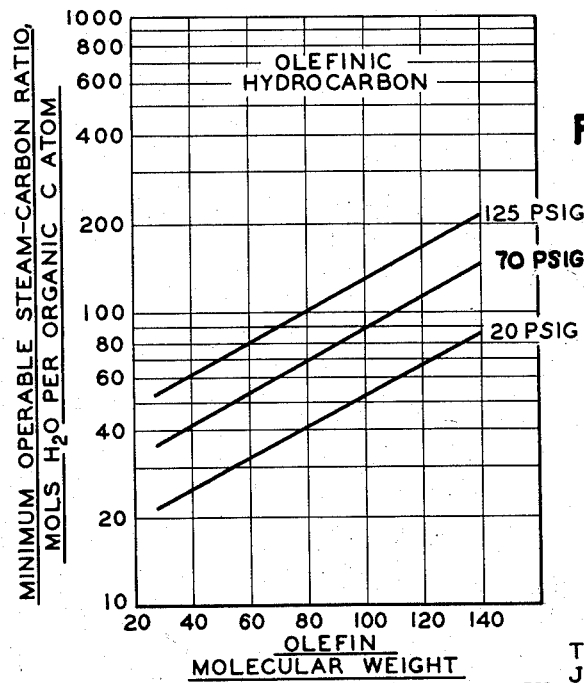

FIGURE 2 of the drawing presents experimental data in semi-logarithmic form correlating the minimum operable steam-carbon ratio in mols of water per organic carbon atom with molecular weight for olefinic hydrocarbons. The operating pressure in the catalytic reforming zone affects the relationship and, therefore, has been shown as a parameter. Including the effect of pressure, the linear relationship between the variables of FIGURE 2 is expressed in mathematical form as:

$$(R_1)_0 = (0.244p + 8.15)(10)^{0.0052\,M} \ldots \quad (2)$$

where
$(R_1)_0$ = the minimum operable steam-carbon ratio for an olefinic hydrocarbon, mols steam per organic carbon atom;
$p$ = operating pressure in the catalytic reforming zone, p.s.i.a.; and
$M$ = molecular weight of the olefinic hydrocarbon.

The weighted average relationship between the minimum operable steam-carbon ratio for a feedstock containing a mixture of hydrocarbons and the minimum operable steam-carbon ratios for the individual hydrocarbon constituents of the mixture as found in FIGS. 1 and 2 or by Equations 1 and 2 is then expressed mathematically as:

$$R_m = \frac{y_1 n_1 R_1 + y_2 n_2 R_2 + \ldots y_i n_i R_i}{y_1 n_1 + y_2 n_2 + \ldots y_i n_i} \ldots \quad (3)$$

where
$R_m$ = the minimum operable steam-carbon ratio for a feedstock containing a mixture of hydrocarbons, mols steam per organic carbon atom;
$y_i$ = the mol fraction of the "$i$th" component in the feedstock;
$n_i$ = the carbon number of the "$i$th" component in the feedstock; and
$R_i$ = the minimum operable steam-carbon ratio of the "$i$th" component in the feedstock.

Equation 3 is a mathematical expression for a weighted average where the average is weighted according to the mol fraction and carbon number of each of the hydrocarbon constituents. Where the feedstock contains hydrogen, nitrogen, carbon monoxide, or carbon dioxide, such component or components are treated as a diluent insofar as Equation 3 is concerned since these materials have little or no effect on the amount of steam required for carbon-free catalytic reforming. In the case of carbon dioxide, this procedure introduces a slight safety factor, since the carbon dioxide acts much like steam as an oxidizing agent. For feedstocks containing appreciable amounts of carbon dioxide, one mole of carbon dioxide is approximately equivalent to 0.40 mol of steam in preventing carbon formation.

In general, the relationships of Equations 1, 2 and 3 establish the critical minimum amount of steam required for carbon-free catalytic reforming of individual hydrocarbons heavier than methane and of feedstocks containing mixtures of hydrocarbons, including olefinic hydrocarbons, when such catalytic reforming is conducted under suitable reforming conditions and with standard high-nickel compounded reforming catalyst. Suitable reforming conditions include initial hydrocarbon feedstock temperatures or preheat of about 600 to about 1200° F., reforming pressure between about 0 and about 350 p.s.i.g., and temperatures maintained in the reforming zone of about 1100° F. to about 1850° F.

The catalytic steam reforming process described above contemplates a sulfur-free feedstock, i.e., one containing sulfur of less than about 5 p.p.m. Sulfur much in excess of these amounts temporarily poisons reforming catalysts and reduces their activity. Furthermore, sulfur poisoning can also cause a decline in catalyst selectivity, leading to carbon formation at normally safe steam-carbon ratios.

Preheating of the hydrocarbon feedstock to between about 600 and 1200° F. renders attainment and maintenance of suitable temperatures in the reforming zone easier. This is of some importance because if the feedstock initially contacts reforming catalyst at excessively low temperature, an otherwise adequate steam-carbon ratio will not prevent carbon formation at or near the entrance to the catalyst bed. Since catalytic steam reforming is endothermic and there are practical limits to the amount of heat which can be added to maintain suitable temperatures of about 1100° F. to about 1850° F. in the reforming zone, it is preferred to preheat the feedstock to as high a temperature as is consistent with avoiding pyrolysis or other heat deterioration of the feedstock.

Preheat temperatures in the range of 600 to 1200° F. have no significant effect upon the minimum operable steam-carbon ratios for carbon-free reforming of non-olefinic hydrocarbons. Thus, FIGURE 1 and Equation 1 can be used without regard to preheat temperature. In the range of about 600 to 900° F. preheat FIGURE 2 and Equation 2 can be used independent of preheat temperature to determine the minimum operable steam-carbon ratio for carbon-free reforming of olefinic hydrocarbons. However, as preheat temperatures are increased above about 900° F., minimum operable steam-carbon ratios required for olefinic hydrocarbons decrease below the value corresponding to a preheat of 600-900° F. At a preheat of 1200° F. the required minimum operable steam-carbon ratio for an olefinic hydrocarbon is about two-thirds of its value at a preheat of 600-900° F. and as given in FIGURE 2 and Equation 2. The effect upon the minimum operable steam-carbon ratio in the range of 900-1200° F. preheat varies uniformly with temperature. Thus, it is preferred to use high preheat or reactor inlet temperatures for feedstocks containing olefinic hydrocarbons which consist of the lighter, more thermally stable $C_2$-$C_4$ olefins. In this case, the minimum operable steam-carbon ratio obtained for the olefinic constituents from FIGURE 2 or Equation 2 for use in Equation 3 is reduced according to a correction factor between unity and about 0.67 depending upon the preheat temperature in the range 900-1200° F. used.

Reactor pressures between about 0 and about 350 p.s.i.g. are used in practicing the invention. Pressure has no significant effect upon minimum operable steam-carbon ratios for non-olefinic hydrocarbons but has an appreciable effect upon such ratios for olefinic hydrocarbons as is seen in FIGURE 2. For olefinic hydrocarbons, rising reforming pressure results in increasing required minimum operable steam-carbon ratios. The choice of a particular operating pressure is principally influenced by the pressure required for the hydrogen product of the present process. For many subsequent uses of the hydrogen product elevated pressures are required and it is advantageous to conduct the reforming process at substantial superatmospheric pressure so as to reduce subsequent compression. Generally, it is preferred to operate the catalytic reforming zone at a pressure between about 0 and about 175 p.s.i.g.

The present invention contemplates use of high-nickel compounded reforming catalysts, a number of which are available commercially. Typical commercially available catalysts useful in the process of the invention include Girdler's G–29 catalyst manufactured by the Chemetron Corp. and American Cyanamid's NR–1 reforming catalyst. These catalysts are compounded and extruded to give high surface areas of the order of 40 to 70 square meters per gram and relatively uniform distribution of nickel throughout the particles, nickel constituting between about 15 and about 35 weight percent of the catalyst. The principal constituents of such commercially available reforming catalysts include nickel oxide, alumina, silica, iron oxide, calcium oxide, and magnesium oxide. Such compounded catalysts are preferred to impregnate catalysts which have a much lower initial surface area of about 2-5 square meters per gram and which can be less selective than compounded catalysts, leading to higher minimum operable steam-carbon ratios.

Space velocities in the reforming zone are influenced by the activity of the catalyst used and the required degree of hydrocarbon conversion.

Generally, it is preferred to use space velocities in the catalytic reforming zone of between about 350 and about 750 volumes of $C_1$ hydrocarbon equivalent per hour per volume of reforming catalyst. Varying the space velocity in the preferred range has no significant effect upon minimum operable steam-carbon ratios. Consequently, the correlations presented in FIGURES 1 and 2 and in Equations 1, 2 and 3 apply independent of space velocity.

As indicated, the reforming reaction is endothermic, so that it is necessary to heat the hydrocarbon and steam reactants while they pass over the catalyst in order to provide reaction heat at elevated reforming temperatures. Such heating is normally carried out in a furnace provided with heater tubes containing the catalyst over which the reactants pass. Any other suitable means can be used of course to provide the necessary heat.

While observance of the critical minimum steam-carbon ratio is essential to successful operation of a catalytic steam reforming process, there is no upper limit to steam-carbon ratios which can be used from the standpoint of operability. As a practical economic matter, it is usually preferred to operate with the lowest possible steam-carbon ratio in view of the cost of steam. Steam-carbon ratios somewhat higher than the critical minimum values are normally used to provide a reasonable safety factor within which normal variations in operating conditions will not result in carbon formation.

Comparison of FIGURES 1 and 2 illustrates the pronounced effect of unsaturation upon the minimum operable steam-carbon ratio for hydrocarbons with any given carbon number. Far greater steam-carbon ratios are required for the reforming of olefinic hydrocarbons. Consequently, highly olefinic feedstocks require relatively high steam-carbon ratios for carbon-free catalytic reforming. To reduce the required steam-carbon ratio for high olefinic feedstocks or for feedstocks containing appreciable amounts of aliphatic hydrocarbons less saturated than olefins, such feedstocks can be partially or wholly hydrogenated prior to treatment by the process of the present invention. Economic considerations influence the extent, if any, of such prior hydrogenation.

The following examples illustrate the experimental basis by which the figures were derived and some preferred ways in which the correlations presented are applied.

EXAMPLE I

Experiments were made in a commercial bench-scale resistance furnace having a bore or reactor well about two inches in diameter the walls of which are adapted to be resistance heated. The reactor well was divided into an upper inlet preheat zone and a lower outlet reaction zone containing 425 milliliters (430 grams) of a commercial preactivated high-nickel compounded reforming catalyst (⅛ inch extrusions about ¼ inch long). Analysis for the principal constituents of the fresh catalyst which was Girdler's G-29 catalyst gave 30.3 percent nickel oxide, 11.0 percent alumina, 25.5 percent silica, 3.6 percent magnesium oxide, 1.4 percent ferric oxide, and 19.0 percent calcium oxide, all percentages by weight.

Hydrocarbon liquid and water were separately metered through calibrated restriction tubes at a rate in accordance with a predetermined steam-carbon ratio and space velocity. The liquids were mixed, vaporized and introduced to the upper inlet preheating zone of the furnace. Heating of the vaporous mixture in the preheating zone was controlled to give the predetermined preheat as sensed by thermocouples placed in the reactor well and its walls. The preheated vaporous mixture then passed in contact with the reforming catalyst in the lower outlet zone of the reactor well, the mixture being heated during its contact with the catalyst to maintain it at suitable reforming temperatures, also as sensed by thermocouples placed in the reactor.

Product gases were cooled so as to condense unreacted water and separate the non-condensible gases. The condensed water was collected and weighed and the non-condensible gases were metered through a wet-test gas meter before being vented to atmosphere. Prior to metering, the non-condensed gases passed through a back-pressure regulator by means of which a predetermined pressure was maintained in the furnace. Samples were taken of the non-condensible gases and analyzed. Pressure drop across the catalyst bed was measured to give an indication of carbon formation as shown by a measurable change in the reactor pressure drop.

With this equipment and procedure, a series of runs was made on ASTM grade n-heptane having less than 1 p.p.m. sulfur, starting at a high steam-carbon ratio and gradually reducing the ratio in successive runs until carbon formation resulted. The results are given in Table I.

*Table I*

MINIMUM OPERABLE $H_2O/C_1$ FOR n-HEPTANE

| Run Number | 1 | 2 | 3 | 4 | 5 |
|---|---|---|---|---|---|
| Duration, Hr | 12 | 12 | 12 | 12 | 12 |
| $H_2O/C_1$ Ratio | 5.45 | 4.29 | 3.67 | 3.03 | 2.53 |
| Reactor Inlet Temp., °F | 770 | 815 | 825 | 795 | 805 |
| Reactor Outlet Temp., °F | 1,410 | 1,405 | 1,415 | 1,400 | 1,400 |
| $C_1$ space velocity, v./Hr./v | 298 | 286 | 292 | 318 | 323 |
| Reactor Outlet Pres., p.s.i.g | 20 | 19 | 19 | 20 | 20 |
| Rate of Reactor ΔP Increase, Inches $H_2O$/Hr | 0 | 0 | 0 | 0 | 0.38 |
| Product Gas Analysis, Mol. percent: | | | | | |
| CO | 10.9 | 13.4 | 14.8 | 15.9 | 18.9 |
| $CO_2$ | 15.3 | 13.6 | 12.1 | 10.7 | 9.4 |
| $H_2$ | 73.8 | 73.0 | 73.1 | 73.3 | 71.6 |
| $CH_4$ | | | | 0.1 | 0.1 |

The data in Table I show that the minimum operable steam-carbon ratio for n-heptane is about 3.0. This point was plotted on FIG. 1 opposite the molecular weight of n-heptane, 100.

EXAMPLE II

The validity of the correlations presented and the way in which they are used is illustrated by comparing the experimental minimum operable steam-carbon ratio for reforming a mixture of hydrocarbons with the calculated predicted ratio. A non-olefinic naphtha feedstock containing appreciable quantities of naphthenes and aromatics was tested in the apparatus and by the procedure of Example I. An experimental minimum operable steam-carbon ratio of 3.90 was determined. The naphtha feedstock had the approximate composition given in Table II.

*Table II*

NON-OLEFINIC NAPHTHA FEEDSTOCK COMPOSITION

| Component: | Mol fraction |
|---|---|
| $C_5$ | 0.05 |
| $C_6$ | 0.15 |
| $C_7$ | 0.20 |
| $C_8$ | 0.20 |
| $C_9$ | 0.20 |
| $C_{10}$ | 0.20 |

Using operability limits from FIGURE 1 or Equation 1 for the components given in Table II and substituting in Equation 3:

$$R_m = \frac{(0.05)(5)(2.15) + (0.15)(6)(2.50) + (0.20)(7)(3.00) + \cdots}{(0.05)(5) + (0.15)(6) + (0.20)(7) + \cdots} = 3.80$$

The value predicted from the correlations agrees closely with the experimental value.

EXAMPLE III

As a further illustration of the excellent agreement obtained between experimental values and those predicted from the correlation, the same naphtha feedstock used in Example II was tested with a recycle gas in admixture to determine the minimum operable steam-carbon ratio of the admixture. In separate tests, where 1.82 mols of recycle gas containing 50 mol percent hydrogen, 30 mol percent nitrogen, and 20 mol percent methane were admixed per mol of naphtha, operability limits of 3.6 and 3.8 $H_2O/C_1$ were obtained.

Since hydrogen and nitrogen have been shown to be diluents, Equation 3 can be applied to $C_{8.6}H_{17.2}$ naphtha (corresponds to $M=120$ in FIGURE 1), as found in Example II, and to methane requiring 1.1 $H_2O/C_1$, as found in FIGURE 1. The following result is obtained:

$$R_m = \frac{(0.27)(1)(1.10) + (0.73)(8.6)(3.80)}{(0.27)(1) + (0.73)(8.6)} = 3.68$$

This is in excellent agreement with experimental values. If the carbon number weighing function is not employed in Equation 3 for this calculation, a predicted value of about 3.1 $H_2O/C_1$ is calculated, which is obviously in error.

EXAMPLE IV

As an example of the validity of the correlation in predicting minimum operable steam-carbon ratios for feedstocks containing olefinic hydrocarbons, a feedstock containing 2.0 mol percent propylene, 10.0 mol percent butane, and 88.0 mol percent propane was tested at 125 p.s.i.g. and 600–700° F. reactor inlet temperature in the apparatus and in accordance with the procedure of Example I. An operability limit of about 2.90 $H_2O/C_1$ was found.

From FIGURE 1 or Equation 1, propane and butane are estimated to require about 1.50 and 1.80 $H_2O/C_1$, respectively. From FIGURE 2 or Equation 2, propylene is estimated to require 64 $H_2O/C_1$ at 125 p.s.i.g. and 600–700° F. No temperature correction for propylene is made since the preheat temperature is in the range of 600–900° F. Substitution in Equation 3 gives:

$$R_m = \frac{(0.88)(3)(1.50) + (0.10)(4)(1.80) + (0.02)(3)(64)}{(0.88)(3) + (0.10)(4) + (0.02)(3)} = 2.75$$

Similar comparisons such as those made in Examples II–IV indicate that the correlations of the present invention correctly predict within ten percent the minimum operable steam-carbon ratios for the catalytic steam reforming of hydrocarbon mixtures including olefins.

Thus, by an analysis of any feedstock containing non-olefinic and/or olefinic hydrocarbons and by a determination of the minimum operable steam-carbon ratio based on the analysis and the correlations herein presented, it is possible to successfully reform the feedstock.

Various alterations and modifications of the invention may be used as will be evident to one skilled in the art.

We claim:
1. A process for the production of hydrogen by catalytic steam reforming of hydrocarbons which comprises admixing a feedstock containing a non-olefinic hydrocarbon heavier than methane and containing sulfur of less than about 5 p.p.m. with at least sufficient steam to satisfy the relationship

$$(R_i)_{n=0} = (0.89)(10)^{0.0052 M}$$

in which $(R_i)_{n=0}$ is the minimum operable steam-carbon ratio for said non-olefinic hydrocarbon heavier than methane expressed as mols steam per organic carbon atom and M is the molecular weight of said non-olefinic hydrocarbon heavier than methane, and contacting said admixture in vapor phase and under reforming conditions with a high-nickel compounded reforming catalyst.

2. A process for the production of hydrogen by catalytic steam reforming of hydrocarbons which comprises admixing a feedstock containing at least two non-olefinic hydrocarbons and containing sulfur of less than about 5 p.p.m. with at least sufficient steam to satisfy the relationship $$R_m = \frac{y_1 n_1 R_1 + y_2 n_2 R_2 + \ldots y_i n_i R_i}{y_1 n_1 + y_2 n_2 + \ldots y_i n_i}$$

in which $R_m$ is the minimum operable steam-carbon ratio for said feedstock expressed as mols steam per organic carbon atom, $y_i$ is the mol fraction of the "$i$th" component in said feedstock, $n_i$ is the carbon number of the "$i$th" component in said feedstock, and $R_i$ is the minimum operable steam-carbon ratio for the "$i$th" component of said feedstock and in which R for each of said non-olefinic hydrocarbons has the value $$(R_i)_{n=0} = (0.89)(10)^{0.0052 M}$$

in which $(R_i)_{n=0}$ is the minimum operable steam-carbon ratio for each of said non-olefinic hydrocarbons expressed as mols steam per organic carbon atom and M is the molecular weight of each of said non-olefinic hydrocarbons, and contacting said admixture in vapor phase and under reforming conditions with a high-nickel compounded reforming catalyst.

3. A process for the production of hydrogen by catalytic steam reforming of hydrocarbons which comprises admixing a non-olefinic hydrocarbon feedstock heavier than natural gas containing sulfur of less than about 5 p.p.m. with at least sufficient steam to satisfy the relationship $$R_m = \frac{y_1 n_1 R_1 + y_2 n_2 R_2 + \ldots y_i n_i R_i}{y_1 n_1 + y_2 n_2 + \ldots y_i n_i}$$

in which $R_m$ is the minimum operable steam-carbon ratio for said feedstock expressed as mols steam per organic carbon atom, $y_i$ is the mol fraction of the "$i$th" component in said feedstock, $n_i$ is the carbon number of the "$i$th" component in said feedstock, and $R_i$ is the minimum operable steam-carbon ratio for the "$i$th" component of said feedstock having the value $$(0.89)(10)^{0.0052 M}$$

in which M is the molecular weight of the "$i$th" component of said feedstock, and contacting said admixture in vapor phase and under reforming conditions with a high-nickel compounded reforming catalyst.

4. A process according to claim 3 in which said reforming conditions include an initial temperature between about 600° F. and about 1200° F., an operating pressure of about 0 to about 350 p.s.i.g. and temperatures maintained between about 1100° F. and about 1850° F.

5. A process for the production of hydrogen by catalytic steam reforming of hydrocarbons which comprises admixing a feedstock containing at least one non-olefinic and at least one olefinic hydrocarbon, said feedstock containing sulfur of less than 5 p.p.m., with at least sufficient steam to satisfy the relationship $$R_m = \frac{y_1 n_1 R_1 + y_2 n_2 R_2 + \ldots y_i n_i R_i}{y_1 n_1 + y_2 n_2 + \ldots y_i n_i}$$

in which $R_m$ is the minimum operable steam-carbon ratio for said feedstock expressed as mols steam per organic carbon atom, $y_i$ is the mol fraction of the "$i$th" component in said feedstock, $n_i$ is the carbon number of the "$i$th" component in said feedstock, and $R_i$ is the minimum operable steam-carbon ratio for the "$i$th" component of said feedstock, $R_i$ having the value for each non-olefinic hydrocarbon of $$(0.89)(10)^{0.0052 M}$$

$R_i$ having the value for each olefinic hydrocarbon of $$(0.244p + 8.15)(10)^{0.0052 M}$$

in which M is the molecular weight of the "$i$th" component in each instance and $p$ is the operating pressure of the process expressed in p.s.i.a., and contacting said admixture in vapor phase and under reforming conditions with a high-nickel compounded reforming catalyst.

6. A process according to claim 1 in which said catalyst contains between about 15 and about 35 weight percent nickel and is characterized by a high surface area of the order of 40 to 70 square meters per gram.

7. A process according to claim 2 in which said catalyst contains between about 15 and about 35 weight percent nickel and is characterized by a high surface area of the order of 40 to 70 square meters per gram.

8. A process according to claim 3 in which said catalyst contains between about 15 and about 35 weight percent nickel and is characterized by a high surface area of the order of 40 to 70 square meters per gram.

9. A process according to claim 4 in which said catalyst contains between about 15 and about 35 weight percent nickel and is characterized by a high surface area of the order of 40 to 70 square meters per gram.

10. A process according to claim 5 in which said catalyst contains between about 15 and about 35 weight percent nickel and is characterized by a high surface area of the order of 40 to 70 square meters per gram.

References Cited in the file of this patent

UNITED STATES PATENTS

| | | |
|---|---|---|
| 1,915,363 | Hanks et al. | June 27, 1933 |
| 2,164,403 | Guthrie et al. | July 4, 1939 |
| 2,628,890 | Shapleigh | Feb. 17, 1953 |
| 2,699,986 | Buell et al. | Jan. 18, 1955 |